No. 639,497. Patented Dec. 19, 1899.
S. & F. D. BANGS.
APPARATUS FOR PURIFYING AND COOLING AIR.
(Application filed Aug. 9, 1899.)
(No Model.)
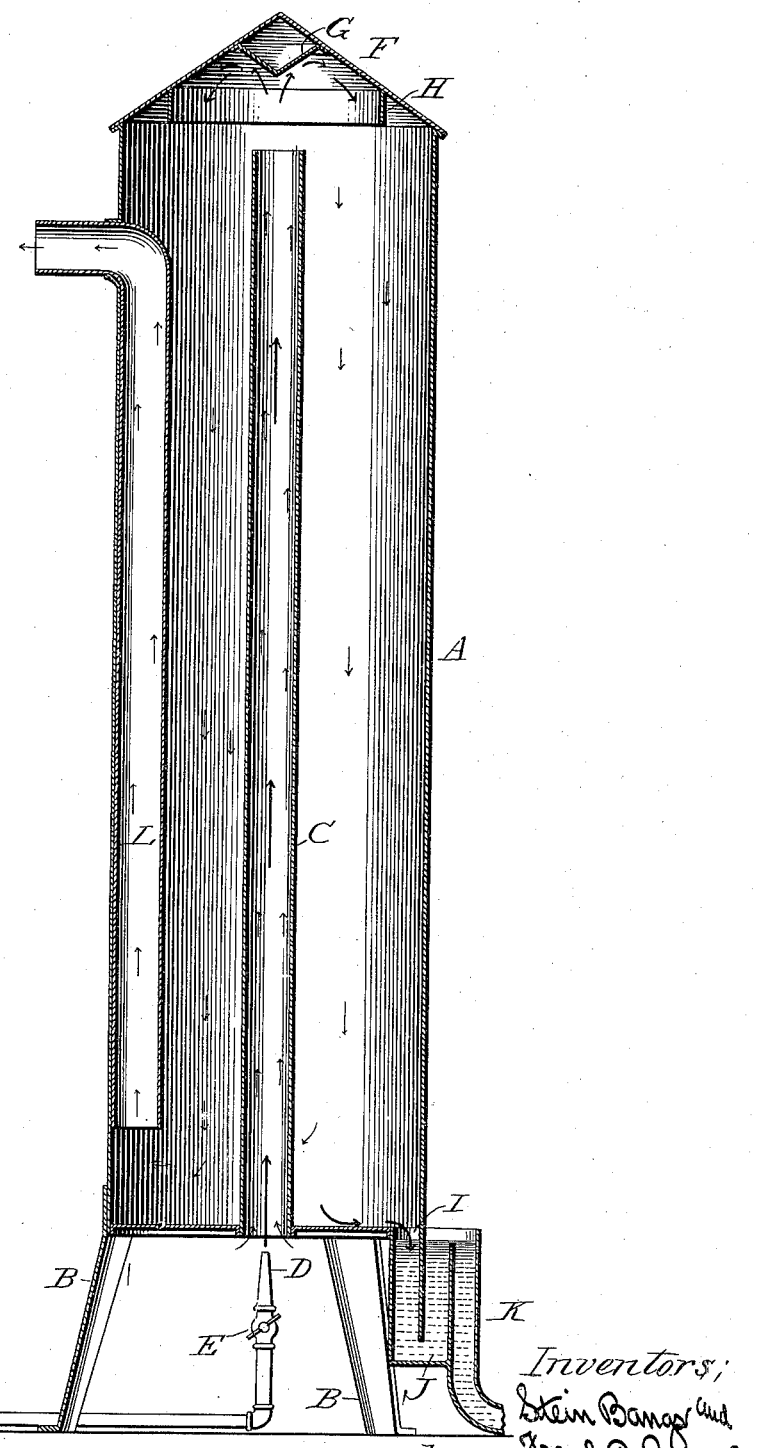

UNITED STATES PATENT OFFICE.

STEIN BANGS AND FRANK D. BANGS, OF LEAD, SOUTH DAKOTA.

APPARATUS FOR PURIFYING AND COOLING AIR.

SPECIFICATION forming part of Letters Patent No. 639,497, dated December 19, 1899.

Application filed August 9, 1899. Serial No. 726,659. (No model.)

*To all whom it may concern:*

Be it known that we, STEIN BANGS and FRANK D. BANGS, citizens of the United States, residing at Lead, in the county of Lawrence and State of South Dakota, have invented certain new and useful Improvements in Apparatus for Purifying and Cooling Air, of which the following is a specification.

The present invention relates to an improved apparatus for purifying and cooling air, the construction and advantages of which will be hereinafter set forth, reference being had to the annexed drawing, wherein the device is shown in a vertical sectional view.

Referring to the said drawing, A indicates the main body or chamber of the apparatus, preferably cylindrical in cross-section and mounted on suitable legs or supports B. Extending up through the bottom thereof and rising to a point near the upper end of the chamber is an intake tube or pipe C, beneath the lower open end of which is mounted a nozzle D, provided with a suitable cock or other regulating device E.

The upper end of the main chamber or cylinder is closed by a cover F, preferably made conical, and to the under side of which is secured an inverted conical deflector G, which occupies a position directly over the upper end of the upright intake tube or pipe C. The cover has also secured to it by any suitable means a depending skirt or rim H.

At the bottom of the cylinder, and preferably at one side thereof, we provide a suitable outlet I, which is in direct communication with a trap J. To the outer leg of the trap there is connected a waste-pipe K, so arranged that the water will pass from the outer leg of the trap to the waste-pipe. The air exit or outlet is made in the form of a pipe or channel L, which extends out through the main body of the chamber, near its upper end, while the lower end of the pipe or outlet comes down close to the bottom of the main chamber or cylinder. The outlet may be connected with any suitable pipe and the air passing therefrom conveyed to any desired point.

In the practical use of the device a spray or jet of water passes out of the nozzle D and up through the central intake-pipe C, the jet of water drawing in air with it, as indicated by the small arrows, and carrying it up along through said intake-pipe into the main body of the apparatus. The jet or spray of water passes out of the upper end of the intake-pipe C and impinges against the inverted conical deflector G, where it is caused to break up and finds its way over to the depending skirt H. Any water which strikes the skirt will be carried away from over the mouth of the tube C and dropped down through the entire length of the cylinder or main chamber to the bottom thereof, whence it will pass out through the trap J to the waste-pipe. Any other particles of water which may not come against the depending skirt will, nevertheless, by reason of the inverted deflector G, be thrown around in the cylinder and will find their way to the bottom thereof. The air in passing up through the central intake-pipe C with the water and traversing downwardly through the entire length of the cylinder will become cooled to a certain degree, as well as freed of any particles of dust or extraneous matter. In passing up through the outlet or exit pipe L the air, should it have carried any particles of water along with it, will have an opportunity to free itself of such particles and will consequently pass out of the apparatus in a relatively dry condition, or at least in such a condition as to be comparatively clear of moisture.

By reason of the lower portion of the apparatus being trapped or held under a water seal the air which is drawn in by the water-jet must of necessity pass up through the outlet-pipe.

Having thus described our invention, what we claim is—

1. In an air cooling and purifying apparatus, the combination of a main body or chamber; an intake-pipe mounted in the bottom thereof and extending up toward the upper end of said chamber; means for introducing a jet of water into the lower end of said pipe; a deflector secured to the cover of the chamber, over the upper end of the pipe; an air-outlet pipe extending out through the upper end of the chamber and terminating at its lower end at or near the bottom of the chamber; and a water-outlet for the chamber.

2. In an air cooling and purifying apparatus, the combination of a main body or chamber mounted upon suitable supports; a pipe C extending up from the bottom thereof to a point near its upper end; a conical deflector secured to the cover of the chamber, over said pipe; an outlet-pipe L secured within the chamber and having its outer end extending therefrom at a point near the upper end of the chamber; means for introducing a jet of water into the lower open end of said pipe C; and a trapped water-outlet formed at or near the lower end of the chamber.

3. In an apparatus for purifying and cooling air, the combination of a main chamber or cylinder A; a pipe C mounted within said chamber and extending up from the lower end thereof; a conical deflector G secured to the cover of the chamber, over said pipe; a depending skirt H also secured to the cover; an outlet L extending down in the chamber to a point near its bottom and discharging at a point near the upper end of the chamber; means for introducing a jet of water into the lower end of the pipe C; and a trapped outlet for the water, formed at the bottom of the cylinder.

In witness whereof we hereunto set our hands in the presence of two witnesses.

STEIN BANGS.
    FRANK D. BANGS.

Witnesses:
 H. G. DUERFELDT,
 C. D. CHAUSSEL.